US011294887B2

(12) United States Patent
Pippin et al.

(10) Patent No.: US 11,294,887 B2
(45) Date of Patent: Apr. 5, 2022

(54) PARALLEL AUDIT CYCLES BETWEEN PRIMARY AND SECONDARY EVENT FEEDS

(71) Applicant: YAHOO ASSETS LLC, Dulles, VA (US)

(72) Inventors: Michael Pippin, Sunnyvale, CA (US); David Willcox, Urbana, IL (US); Allie K. Watfa, Urbana, IL (US); George Aleksandrovich, Hoffman Estates, IL (US); Jacob Tolar, Champaign, IL (US)

(73) Assignee: YAHOO ASSETS LLC, Dulles, VA (US)

( * ) Notice: Subject to any disclaimer, the term of this patent is extended or adjusted under 35 U.S.C. 154(b) by 24 days.

(21) Appl. No.: 16/881,947

(22) Filed: May 22, 2020

(65) Prior Publication Data
US 2021/0365432 A1 Nov. 25, 2021

(51) Int. Cl.
G06F 15/16 (2006.01)
G06F 16/23 (2019.01)
G06F 16/2455 (2019.01)

(52) U.S. Cl.
CPC ...... *G06F 16/2365* (2019.01); *G06F 16/2456* (2019.01)

(58) Field of Classification Search
None
See application file for complete search history.

(56) References Cited

U.S. PATENT DOCUMENTS

2020/0183913 A1* 6/2020 Murphy .............. G06F 16/9024
2021/0200747 A1* 7/2021 Aleksandrovich ..........................
   G06F 16/2282
2021/0359852 A1* 11/2021 Barrameda ........... H04L 9/0861

* cited by examiner

*Primary Examiner* — Alex Gofman
(74) *Attorney, Agent, or Firm* — James J. DeCarlo; Greenberg Traurig, LLP

(57) ABSTRACT

Disclosed are embodiments for providing batch performance using a stream processor. In one embodiment, a method is disclosed comprising completing a first audit for a primary event type, the first audit generating a set of primary events and completing a second audit for a secondary event type, the second audit generating a draft set of secondary events and an auxiliary feed of un-joined secondary events. The method then performs a join audit check on the auxiliary feed of un-joined secondary events and a set of flags, each flag in the set of flags indicating that a respective un-joined secondary event was properly joined. Based on the results of the join audit check, the method replays a subset of the un-joined secondary events in the auxiliary feed upon determining that the join audit check failed.

20 Claims, 8 Drawing Sheets

PARALLEL AUDIT CYCLES BETWEEN PRIMARY AND SECONDARY EVENT FEEDS

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

In the era of big data processing, data pipelines have become vital to ingesting, processing, and outputting large quantities of data at high velocity and having high variability. In general, a data pipeline comprises a series of automated processing stages that take raw input data and convert the raw input data into a more suitable format for consumption by downstream computer processing systems.

Various architectures of data pipelines exist, including batch, Lambda, and Kappa architectures. Batch data pipelines process data in "batches" at regular intervals and are suitable for non-critical functionality while providing high reliability of data processing. Batch data pipelines, however, suffer from not being able to process data in real-time. Thus, a lag behind the ingestion of data and output of useful information or knowledge always exists in a batch data pipeline.

Lambda pipelines utilize a batch processor concurrently with a stream processor. In these pipelines, the batch processor processes all data within a historical batch while the stream processor "augments" the processed batch data with the results of stream processing. Eventually, the batch processor will "re-process" the data processed by the stream processor and overwrite the information generated by the stream processor. Lambda pipelines are fast, due to the use of stream processors; however, they require duplication of processing logic in both the stream processors and the batch processors. Further, Lambda pipelines use twice the processing hardware due to the use of two separate processing paradigms (i.e., stream and batch, which process the data in the same manner).

Like Lambda pipelines, Kappa pipelines utilize a stream processor. However, Kappa pipelines eschew a batch processor. Kappa pipelines require frequent "re-running" of event streams through the stream processor to provide simulated batch performance. Kappa pipelines ensure that streaming data is processed correctly (e.g., the pipeline does not drop or duplicate data); however, these pipelines ensure this by re-executing processing and are thus slower than pure streaming pipelines. Further, since Kappa pipelines use stream processing techniques, there is no method for performing more complex operations such as joins or aggregations, since these operations inherently require access to a full (e.g., batch) dataset. That is, stream processors inherently cannot perform these operations, thus replaying streams does not remedy this problem.

BRIEF SUMMARY

This disclosure recognizes a need in the art for a new pipeline architecture that provides the advantages of stream processors (e.g., speed) with the advantages of batch processors (e.g., integrity and complex operations). The disclosed embodiments provide these advantages and solve other problems in existing pipelines.

The disclosed embodiments describe an improved big data processing system that uses a stream processing engine with additional hardware and software to harden inaccuracies detected during stream processing.

In one embodiment, a method is disclosed comprising completing a first audit for a primary event type, the first audit generating a set of primary events; completing a second audit for a secondary event type, the second audit generating a draft set of secondary events and an auxiliary feed of un-joined secondary events; performing a join audit check on the auxiliary feed of un-joined secondary events and a set of flags, each flag in the set of flags indicating that a respective un-joined secondary event was properly joined; and replaying a subset of the un-joined secondary events in the auxiliary feed upon determining that the join audit check failed.

In another embodiment, an apparatus is disclosed comprising: a processor; and a storage medium for tangibly storing thereon program logic for execution by the processor, the stored program logic causing the processor to perform the operations of: completing a first audit for a primary event type, the first audit generating a set of primary events; completing a second audit for a secondary event type, the second audit generating a draft set of secondary events and an auxiliary feed of un-joined secondary events; performing a join audit check on the auxiliary feed of un-joined secondary events and a set of flags, each flag in the set of flags indicating that a respective un-joined secondary event was properly joined; and replaying a subset of the un-joined secondary events in the auxiliary feed upon determining that the join audit check failed.

In another embodiment, a non-transitory computer-readable storage medium for tangibly storing computer program instructions capable of being executed by a computer processor, the computer program instructions defining the steps of: completing a first audit for a primary event type, the first audit generating a set of primary events; completing a second audit for a secondary event type, the second audit generating a draft set of secondary events and an auxiliary feed of un-joined secondary events; performing a join audit check on the auxiliary feed of un-joined secondary events and a set of flags, each flag in the set of flags indicating that a respective un-joined secondary event was properly joined; and replaying a subset of the un-joined secondary events in the auxiliary feed upon determining that the join audit check failed.

The illustrated embodiments provide numerous benefits over existing pipelines. The disclosed embodiments reduce data processing and certification times by certifying events using a stream processor versus a batch processor. Thus, the illustrated embodiments, do not require a "waiting" period prior to certifying results and can certify results in real-time or near real-time. The disclosed embodiments additionally utilize a single pipeline and thus do not require the hardware duplication, software complexity, and human resources required by Lambda pipelines. Relatedly, since application-level code must only be deployed once, rapid changes in data processing can be implemented without requiring separate development workflows. Additionally, since only one codebase is used, there is no risk of variations in processing between pipelines. Finally, in existing pipelines, sacrifices for speed can lead to a more significant variation between the initially posted results from the streaming pipeline and the final results from batch processing. As the latency of batch increases relative to streaming, this can lead to a lack

DETAILED DESCRIPTION

Figure 1A:
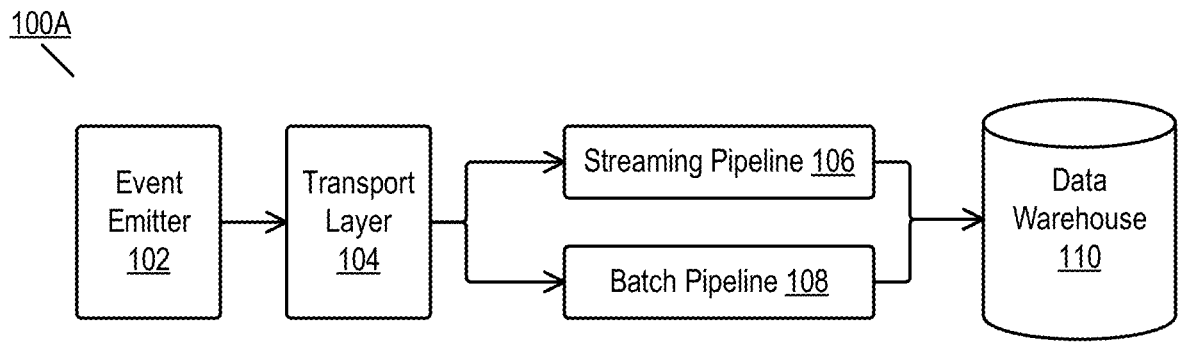
FIG. 1A is a block diagram illustrating a processing system employing a Lambda architecture.

FIG. 1A is a block diagram illustrating a processing system employing a Lambda architecture.

In the illustrated embodiment, events in the system (100a) originate from one or more event emitters (102). As used herein, an event refers to any type of data generated by a computing system. Generally, most events include arbitrary data as well as a timestamp indicating when the event emitter (102) generated the data. Alternatively, or in conjunction with the preceding, the system (100a) adds a timestamp representing the time the pipelines (106, 108) receive the event. In some embodiments, the timestamp comprises a standard time (e.g., based on a 24-hour clock). In some embodiments, the timestamp comprises a numerical value (e.g., time since UNIX epoch). In other embodiments, the timestamp may comprise a sequence number or other incrementing (or otherwise changing) value. In some embodiments, events further include nonce values to ensure uniqueness.

The event emitters (102) can comprise any computing system capable of generating data. The disclosure places no limitations on the type of data or type of systems capable of generating such data. As one example, an event emitter may include a digital analytics system configured to track and monitor user events on webpages or in mobile apps. A digital analytics platform generates many events as users access products. One example is the delivery of advertising creatives. In these scenarios, the analytics platform generates an event indicating that a server transmitted the creative to the end-user. The analytics platform also generates an event indicating that the end-user device displayed the creative (i.e., an impression). If the end-user interacts with the creative, the analytics platform generates a "click" event (which may be any type of interaction including touch events and thus is not limited to physical mouse clicks). In certain embodiments, the analytics platform also generates conversion events that indicate that after an impression, and after a click, the end-user has completed another action (e.g., completes a digital purchase) that is related to the previous events. In some embodiments, the analytics platform tracks all of these events via a client-side identifier stored in, for example, a cookie or other end-user storage mechanism.

In some embodiments, event emitters (102) are part of the system (100a). That is, in some embodiments, the system (100a) includes and has some level of control over the event emitters (102). Examples of this type of arrangement include internal data sources for an organization (e.g., internal analytics tracking). In other embodiments, the event emitters (102) comprise third-party systems. In some embodiments, the system (100a) receives events from both internal and external event emitters (102).

In either scenario, event emitters (102) transmit events over a transport layer (104). The transport layer (104) comprises one or more network protocols and one or more physical media used for transporting data. The disclosure does not unduly limit the structure of the transport layer. In some embodiments, the system (100a) uses an Internet protocol suite (e.g., transmission control protocol (TCP) and Internet protocol (IP)) as the transport layer (104). The system (100a) may use other models such as those adhering to the Open Systems Interconnection (OSI) model or other types of protocol models. In some embodiments, the transport layer (104) performs other operations on the events beyond network routing (e.g., TCP/IP). For example, the transport layer (104) may compress events using, as an example, gzip or other compression algorithms.

The specific internal workings of the transport layer (104) are not limiting, and the system (100a) may ignore various features of the transport layer (104) that are handled entirely in the transport layer (e.g., congestion control in a TCP layer). However, as discussed in more detail herein, the transport layer (104) may include inherent data transfer characteristics that impact the processing of the data by systems. One example, discussed in more detail in FIG. 2 et seq, is that some transport layer (104) designs may unintentionally (or, in some cases, intentionally) duplicate events transmitted over a network. In such networks, the event emitters (102) transmit one event, but the pipelines (106, 108) receive two or more events. A more concrete example of such a transport layer is a publish-subscribe system such as Apache® Kafka, which can provide "at least once" delivery of events.

As illustrated, the system (100a) routes events from the transport layer (104) to both a streaming pipeline (106) and a batch pipeline (108). In the illustrated embodiment, the batch pipeline (108) processes data in batches. As used herein, a batch refers to a period in which the batch pipeline (108) analyzes data (e.g., every hour). The disclosure does not describe the specific inner workings of the batch pipeline (108) in detail; however, the batch pipeline (108) comprises any processing system that provides accurate processing of data. Examples of batch pipelines include Hadoop clusters. The batch pipeline (108) ensures this accuracy by running slowly and at fixed intervals upon receiving all needed data. Since the batch pipeline (108) requires a fixed period of data (e.g., one hour) and a second fixed period to process the data (e.g., three hours), the batch pipelines (108) are consistently "behind" the current time. That is, when the batch pipeline (108) writes data to the data warehouse (110), the data written is "stale" by a fixed amount of time (e.g., four hours in the previous examples). However, as stated above, consumers of the batch-processed data can be confident that the data is accurate.

As a brief aside, before Lambda systems, big data systems often only included a batch pipeline (108) and did not include a streaming pipeline (106). As a result, such systems produced consistently delayed results. To remedy this delay, the system (100a) includes a streaming pipeline (106). Such a pipeline may comprise one or more stream processors such as Apache® Storm processors or similar stream processors. In contrast to the batch pipeline, the streaming pipeline (106) processes data in real-time or near real-time. Thus, when the streaming pipeline (106) receives an event over the transport layer (104), it immediately processes or transforms the event and writes the processed event to the data warehouse (110).

Since the streaming pipeline (106) processes events quickly and in isolation, the streaming pipeline (106) may introduce errors in the processed data. For example, the streaming pipeline (106) generally does not guard against writing duplicate data if the pipeline (106) receives duplicate events. Similarly, the streaming pipeline (106) may inadvertently drop some events. Thus, the streaming pipeline (106) is fast but inaccurate.

In the illustrated embodiment, the data warehouse (110) segments data received from the streaming pipeline (106) and the batch pipeline (108) into two separate storage areas. Additionally, as the batch pipeline (108) "catches up" to the data processed by the streaming pipeline (106), the data warehouse (110) overwrites the results of the streaming pipeline (108). Thus, at any given moment, the data warehouse (110) stores accurate, batch-processed data and a smaller, more recent subset of inaccurate stream-processed data. Absent system failures, the size subset of the inaccurate data remains constant while the size of the accurate data increases over time.

To support the above format of the data warehouse, the system (100a) must duplicate logic between the streaming pipeline (106) and the batch pipeline (108). Since the streaming results must be "reconciled" with the results of the batch processing, the streaming pipeline (106) and batch pipeline (108) must process the events in the same manner. This requirement doubles both the development time and the computing resources needed to support both pipelines (106, 108). Additionally, the system (100a) requires additional software and hardware to enable the data warehouse (110) to perform the reconciliation process after the completion of each batch processing job.

Figure 1B:
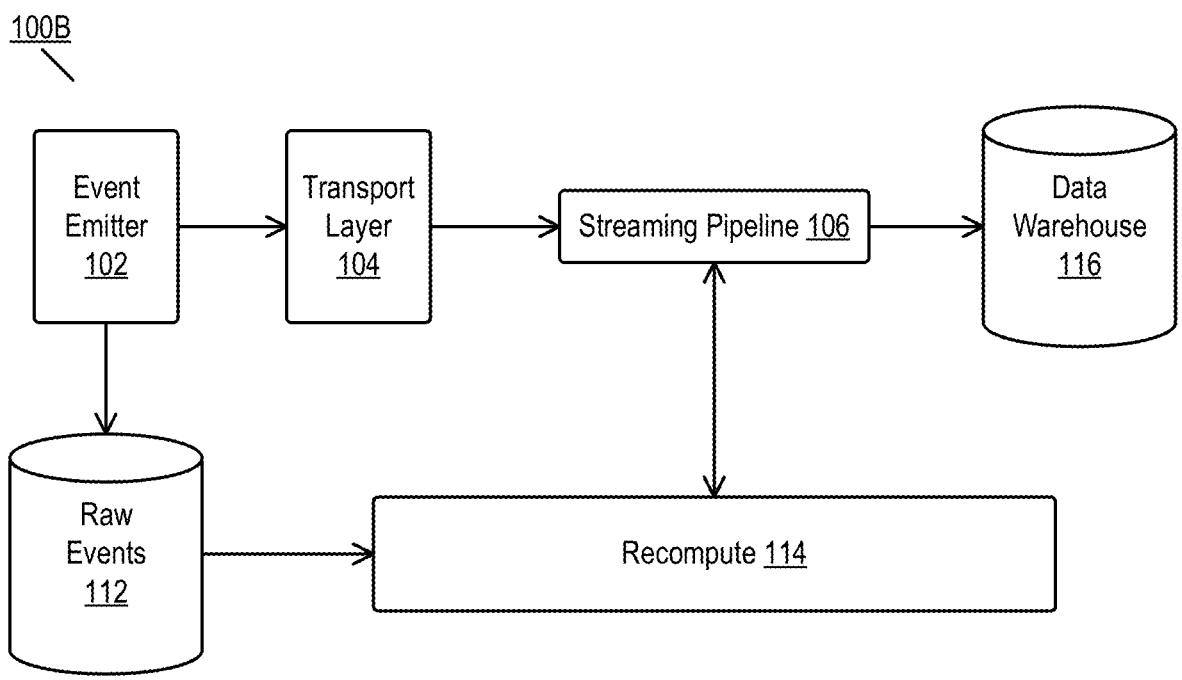
FIG. 1B is a block diagram illustrating a processing system employing a Kappa architecture.

FIG. 1B is a block diagram illustrating a processing system employing a Kappa architecture. The illustrated system (100b) solves some of the problems of Lambda architectures, as discussed in the preceding figure. However, the system (100b) introduces additional problems and fails to provide full batch support.

Various elements of the system (100b) are identical, or nearly identical, to those similarly numbered elements of FIG. 1A. The event emitters (102) and the data transport layer (104) perform the same functions as previously described. Also, the streaming pipeline (106) may perform many, if not all, of the same operations of the streaming pipeline (106) discussed in FIG. 1A.

As illustrated, the streaming pipeline (106) receives events generated by the event emitters (102) over the data transport layer (104). The streaming pipeline (106) processes this data and writes the processed data to the data warehouse (116). In contrast to the data warehouse (110) in FIG. 1A, the data warehouse (116) may only include a single storage area for data given the absence of a batch processing layer.

As described in the description of the previous system (100a), streaming pipelines (106) generally cannot guarantee the accuracy of data processing. Some systems (e.g., 100b) remedy this problem by employing "micro batching" whereby small batches of stream events are processed simultaneously. In general, these batches represent milliseconds of events, thus providing reasonable speed while simulating small batches. Micro-batching, however, fails to provide the level of accuracy provided by larger (e.g., one hour) batches. Another technique uses recompute logic (114) to re-process streaming events when the logic of the streaming pipeline (106) changes or based on other requirements. In this scenario, the system (100b) can store raw events in the raw events storage module (112), the recompute logic (114) retrieves these events. The recompute logic (114) then streams the events into the stream pipeline (106) for re-processing. In one scenario, the recompute logic (114) executes when the system (100b) changes the processing logic of the streaming pipeline. Thus, if the system (100b) modifies how the streaming pipeline (106) processes events, the recompute logic (114) simulates a historical event stream. In another embodiment, the recompute logic (114) can stream data from the raw events storage module (112) to the streaming pipeline (106) at fixed intervals, thus simulating a batch processing mode. However, there are numerous challenges to this approach that limit its effectiveness. First, data from the raw events storage module (112) must be re-streamed in the same order as streamed initially, to ensure the integrity of the re-processing. Thus, the recompute logic (114) reproduces inaccuracies relating to out-of-order events during the re-streaming. Second, the infrastructure that supports the streaming pipeline (106) generally cannot handle significant increases in streaming data, thus limiting the total amount of re-streamed data the streaming pipeline (106) can handle at any given time. Third, and most importantly, the streaming pipeline (106) cannot inherently perform various operations that a batch pipeline (108) can perform, such as joins or aggregations. Thus, even if re-streamed, the output of the streaming pipeline (106) always lacks these advanced operations.

Figure 2:
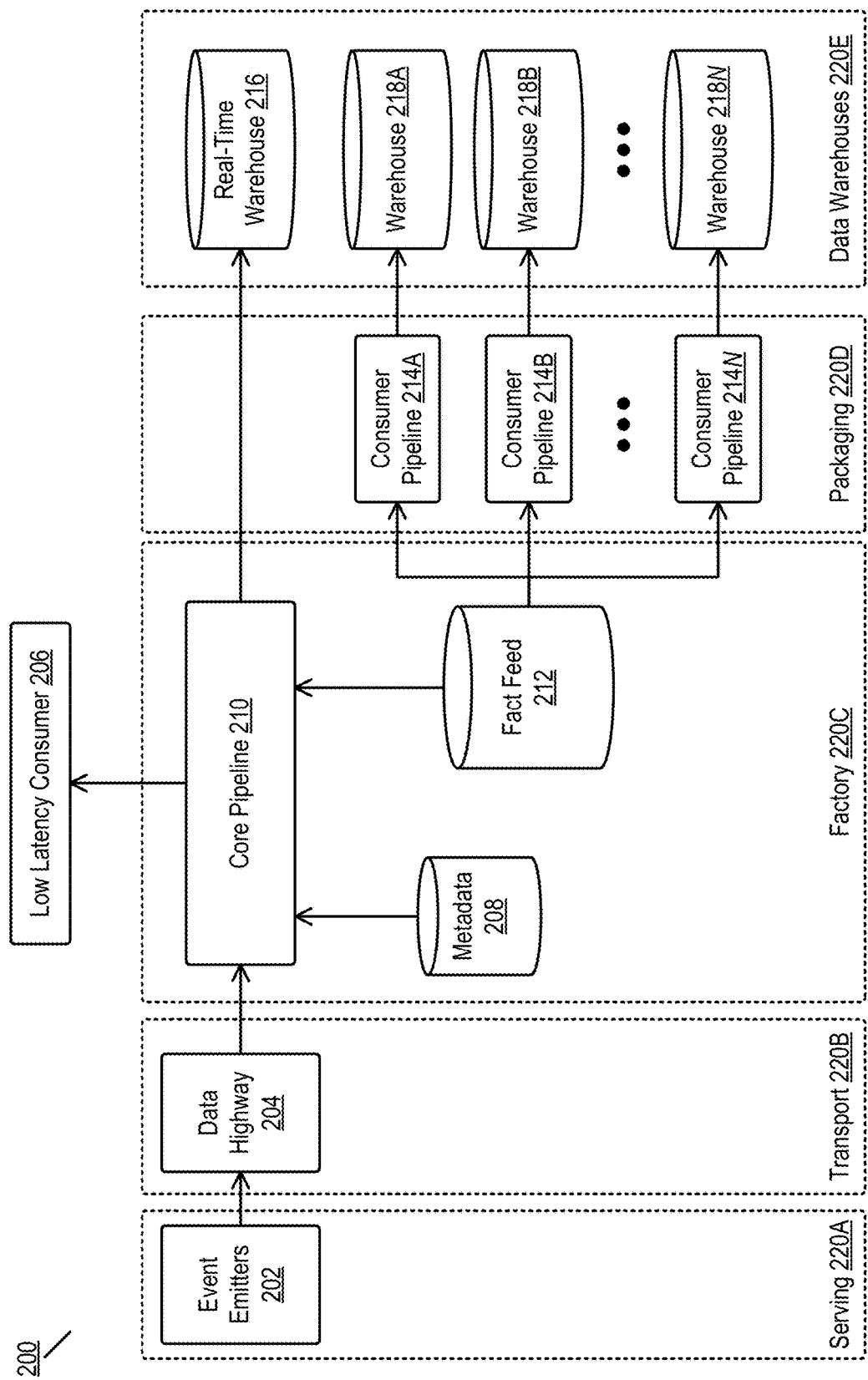
FIG. 2 is a block diagram illustrating a data processing system according to some embodiments of the disclosure.

FIG. 2 is a block diagram illustrating a data processing system according to some embodiments of the disclosure.

The illustrated system (200) segments the data processing into multiple logical layers. In some embodiments, these layers may also comprise physical layers, with each layer physically connected via a network interconnect. The illustrated layers comprise serving (220a), data transport (220b), pipeline factory (220c), packaging (220d), and warehousing (220e) layers.

The serving layer (220a) includes one or more event emitters (202). In the illustrated embodiment, these event emitters (202) can be similar or identical to the event emitters (102) discussed previously. As a few examples, the event emitters (202) can comprise systems including, but not limited to, ad servers, web servers, and beacon servers, that produce raw traffic events and send the events factory layer (220c) via the data transport layer (220b). In the illustrated embodiment, the data transport layer (220b) represents the previously described data transport (204). In the illustrated embodiment, the data transport layer (220b) comprises multiple network topologies and protocols that, when combined, deliver events to the factory layer (220c).

Figure 3:
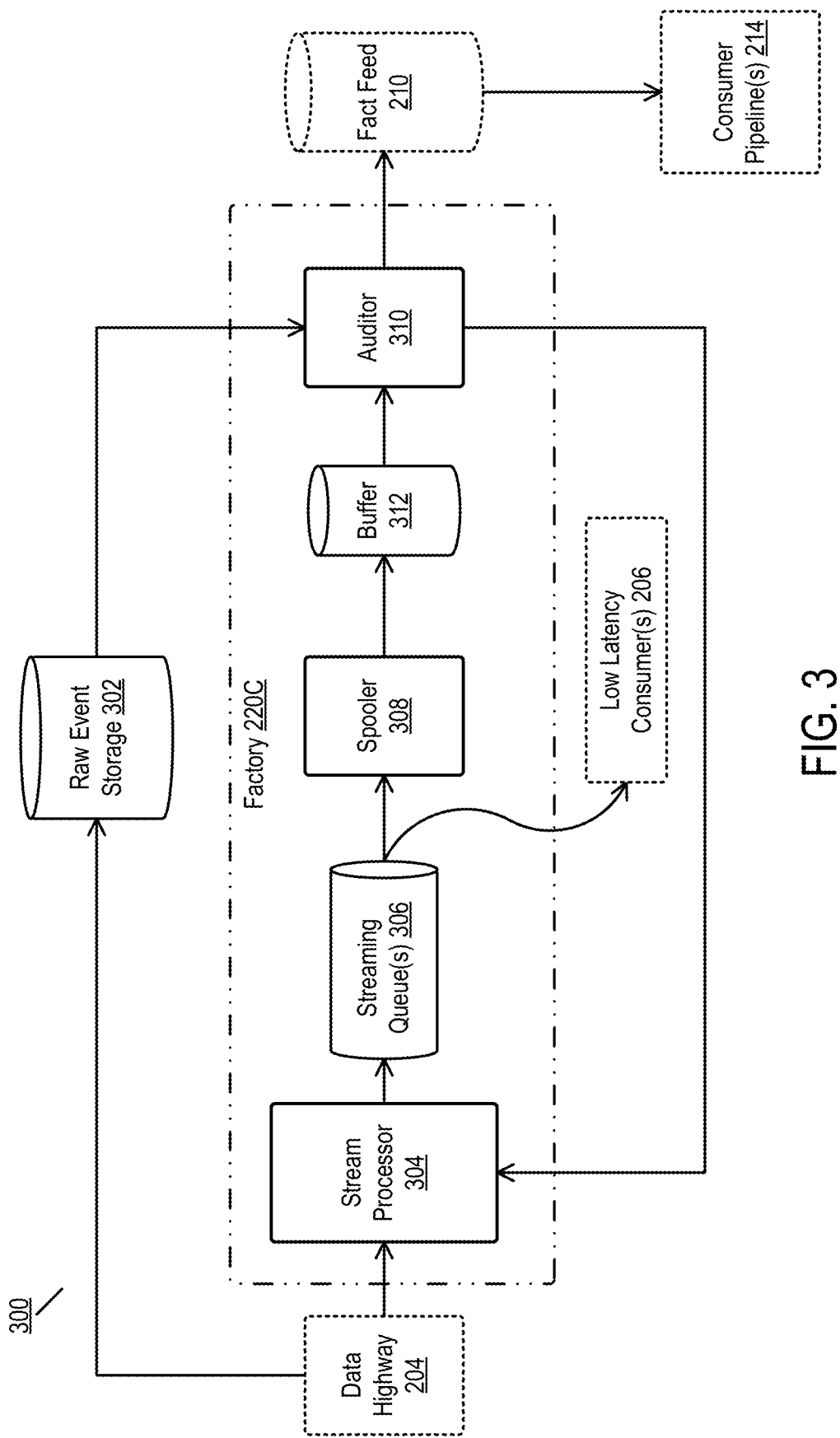
FIG. 3 is a block diagram illustrating a pipeline factory according to some embodiments of the disclosure.
Figure 4:
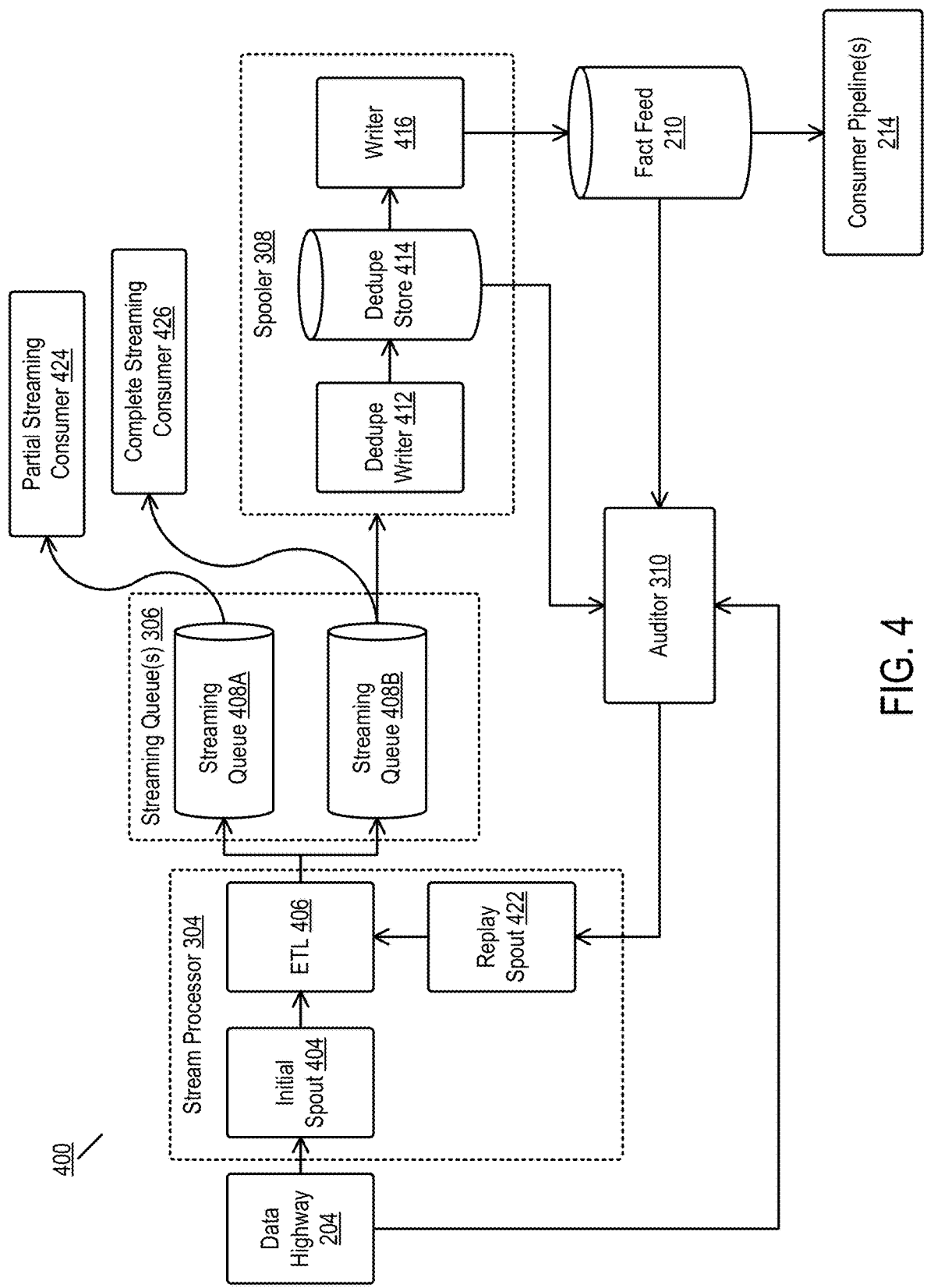
FIG. 4 is a block diagram illustrating a core pipeline according to some embodiments of the disclosure.

In the illustrated embodiment, the factory layer (220c) receives raw events from the data transport layer (220b) and processes the events via a core pipeline (210). The description of FIG. 3 provides further detail regarding the factory layer (220c), and the description of FIG. 4 provides further detail regarding the core pipeline (210). Thus, the following description of the factory layer (220*c*) only briefly describes the layer (220*c*) and the core pipeline (210), and FIGS. 3 and 4 present further detail.

The factory layer (220*c*) is responsible for doing the bulk of the processing of event traffic via the core pipeline (210). The following description describes exemplary processing operations performed by the core pipeline (210). The core pipeline (210) may perform some or all of the following operations as well as additional operations.

In one embodiment, in the serving (220*a*) and data transport (220*b*) layers, devices often compress and bundle data to conserve bandwidth. As a result, the core pipeline (210) may perform a parsing operation that unpacks or processes complex data structures (e.g., blobs) so that downstream consumer systems can access the data. Thus, as one example, the core pipeline (210) can detect that an incoming event was compressed using a gzip algorithm and may first unzip the event.

In another embodiment, the core pipeline (210) performs explosion operations. An explosion operation comprises unpacking composite events. For example, a multi-serve event comprises an event indicating that an end-user device received a set of content to be displayed. Thus, the multi-serve event comprises a data structure describing multiple items of content (e.g., advertisements). The core pipeline (210) may transform a single multi-serve event into multiple single-serve events such that each item of content in the event is associated with an independent event for later processing.

In another embodiment, the core pipeline (210) performs metadata annotation operations. As illustrated, the core pipeline (210) communicates with a metadata store (208). In one embodiment, the metadata store (208) comprises a data storage device such as a MySQL database or other type of relational database. In other embodiments, the metadata store (208) may comprise other types of data storage devices (e.g., a key-value data store). The core pipeline (210) accesses the metadata store (208) to perform dimensional annotation on incoming event data. As used herein, dimensional annotation refers to the augmenting of data with additional other data. For example, a content serving event can be only a line item identifier identifying the served content. The core pipeline (210) may access the metadata store (208) and look up a parent insertion order, an advertiser identifier, and an organization for that line item identifier. The core pipeline (210) may then augment the line item identifier with this metadata to generate an annotated event. In this way, downstream consumer systems can group and aggregate based on the line item identifier.

In another embodiment, the core pipeline (210) performs traffic annotations. A traffic annotation comprises a complex join of an event with a prior event. For example, a click event may need to be joined with a first impression event to annotate the click with auction information or targeting information that is only available in the first impression.

In another embodiment, the core pipeline (210) performs arbitrary computations dictated by business logic. An example of this type of computation is a currency conversion. By doing the operation only once in the core pipeline (210), the system (200) can ensure consistency across all subsequent consumer systems, rather than requiring downstream consumer systems to implement the same rules and possibly arrive at different results.

In another embodiment, the core pipeline (210) validates incoming events. In this embodiment, the core pipeline (210) can filter events based on traffic conditions.

In another embodiment, the core pipeline (210) performs deduplication on incoming events. As discussed previously, the data transport layer (220*b*) may support "at least once" semantics. Alternatively, or in conjunction with the preceding, event emitters may allow duplicate events. Regardless of the source of duplication, the core pipeline (210) ensures that all events are processed and stored once and not duplicated. For example, the core pipeline (210) may allow more than one click event per impression event during a given period.

In another embodiment, the core pipeline (210) performs normalization on the received events. During a normalization operation, the core pipeline (210) "fits" an event to a particular schema or layout to facilitate reporting. This schema or layout is typically a standard field alignment and transformation.

Finally, in some embodiments, the core pipeline (210) performs a fast feedback operation. In this operation, the core pipeline (210) provides feeds or streams of data at very low latency to low-latency consumers (206) such as an ad serving budget control system. Typically, most consumer systems wait until the core pipeline (210) has completed all processing steps; however, some consumer systems are willing to sacrifice quality for timing. These specialty stages can be critical to some consumer systems.

In general, the core pipeline (210) processes events linearly: the quality of the event data increases as data passes from one processing operation to the next. Ultimately, after the core pipeline (210) applies all operations to the event data, the core pipeline (210) writes the processed event to one or more fact feeds (212). In the illustrated embodiment, a fact feed (212) comprises a log of every event that was received by the core pipeline (210) and any additional information that the core pipeline (210) annotates or computes. The fact feeds (210) become the source of truth for the entire system (200). By having the core pipeline (210) compute the fact feed (212) used by subsequent consumers pipelines (214*a*, 214*b*, 214*n*), the overall quality of the system (200) is improved.

Since the system uses a centralized fact feed (212), the core pipeline (210) never removes any field from an event. Additionally, the core pipeline (210) does not modify any raw field that it receives from the core pipeline (210) from the data highway (204). However, as one exception, the core pipeline (210) may replace null or empty fields with a static or default value, as this may assist downstream consumer systems (214*a*, 214*b*, 214*n*). In most embodiments, the core pipeline (210) does not attempt to "correct" or "fix" invalid values in an event. However, the core pipeline (210) may deviate from this requirement to recover from failed launches or bugs. In some embodiments, if the core pipeline (210) violates this requirement and fixes an invalid value in an event, the core pipeline (210) annotates the record with a flag so that a downstream consumer system can monitor the rule.

Importantly, the core pipeline (210) also ensures that no event is duplicated in the final fact feed (212). Thus, the core pipeline (210) never intentionally duplicates or allows duplicate events to result from the operations.

In the illustrated embodiment, the packaging layer (220*d*) comprises various consumer pipelines (214*a*, 214*b*, . . . 214*n*) retrieve or receive data from the fact feed (212). The packaging layer (220*d*) accesses the fact feed (212) and provides the processed events therein to downstream consumer pipelines (214*a*, 214*b*, . . . 214*n*). Whereas the factory layer (220*c*) is typically a complex, but linear processing stage, the packaging layer (220*d*) is typically composed of multiple parallel consumer pipelines (214a, 214b, ... 214n). Consumer pipelines (214a, 214b, ... 214n) are typically minimal, possibly single-stage pipelines that project and aggregate the events in the fact feed (212) for loading into a warehouse (e.g., 218a, 218b, ... 218n) or similar system. The availability of the fact feed (212) triggers consumer pipelines (214a, 214b, ... 214n), and thus the consumer pipelines (214a, 214b, ... 214n) may run in parallel with one another.

In some instances, the consumer pipelines (214a, 214b, ... 214n) are external to the factory layer (220c) and warehouse layer (220e). In other instances, the system (200) includes and controls the consumer pipelines (214a, 214b, ... 214n). Alternatively, or in conjunction with the preceding, the warehousing layer (220e) may be external to the system (200). In various embodiments, the consumer pipelines (214a, 214b, ... 214n) generally perform some or all of the following operations (or combinations thereof).

In one embodiment, the consumer pipelines (214a, 214b, ... 214n) perform mapping and transformation operations. In these operations, the consumer pipelines (214a, 214b, ... 214n) may require the data in a format different than the format of the fact feed (212). For example, the consumer pipelines (214a, 214b, ... 214n) may map enumerated values (possibly in a lossy fashion) to fit a further downstream consumer data model.

In another embodiment, the consumer pipelines (214a, 214b, ... 214n) perform projection operations. In some embodiments, consumer pipelines (214a, 214b, ... 214n) will typically not require every field of the fact feed (212). Thus, the consumer pipelines (214a, 214b, ... 214n) only ingest a small fraction of the available columns.

In another embodiment, the consumer pipelines (214a, 214b, ... 214n) perform aggregation operations. In some embodiments, the consumer pipelines (214a, 214b, ... 214n) aggregate facts and produce metric fields for efficient loading into a database or similar data store.

In another embodiment, the consumer pipelines (214a, 214b, ... 214n) perform reverse annotation joins (e.g., right outer joins). In some embodiments, the consumer pipelines (214a, 214b, ... 214n) perform join operations that cannot be implemented efficiently within the core pipeline (210). For example, a data science consumer pipeline may require a feed containing every impression event joined to any future click events recorded in the fact feed (212). Because this type of pipeline requires data collected over a long period before processing can begin, it would negatively impact all consumer pipelines (214a, 214b, ... 214n) to wait. Therefore, the pipeline performs these joins in batch outside of the core pipeline (210).

In another embodiment, the consumer pipelines (214a, 214b, ... 214n) perform rollup operations. In some embodiments, the consumer pipelines (214a, 214b, ... 214n) may choose to create rollup feeds of the raw facts stored in fact feed (212). For example, the consumer pipelines (214a, 214b, ... 214n) may create an hourly feed from a five-minute fact feed. The consumer pipelines (214a, 214b, ... 214n) may perform this operation to use fewer filenames in a distribute filed system (e.g., the Hadoop Filesystem, HDFS) since such a file system collapses multiple files into larger single files. Further, the rollup may typically transform the data into a columnar format like Optimized Row Columnar (ORC) to promote faster ad hoc projection.

In another embodiment, the consumer pipelines (214a, 214b, ... 214n) perform sketch operations. In some embodiments, as the consumer pipelines (214a, 214b, ... 214n) generate aggregates, the consumer pipelines (214a, 214b, ... 214n) may produce aggregate sketch columns to capture unique users or similar complex computations. The consumer pipelines (214a, 214b, 214n) can perform this expensive operation once on behalf of multiple end-users or downstream systems.

In another embodiment, the consumer pipelines (214a, 214b, ... 214n) perform cleansing operations. In some embodiments, the consumer pipelines (214a, 214b, ... 214n) may cleanse data in the fact feed (212) for a specific purpose. For example, cookies or personally identifiable information (PII) might need to be anonymized, or the consumer pipelines (214a, 214b, ... 214n) may need to obscure data to enforce data visibility controls.

In some embodiments, the consumer pipelines (214a, 214b, ... 214n) can be hierarchal. That is, a first consumer pipeline may perform one or more shared steps, and downstream consumer pipelines use the output of the first consumer pipeline as input.

After processing by consumer pipelines (214a, 214b, ... 214n), each of the consumer pipelines (214a, 214b, ... 214n) output further processed event data to respective data warehouses (218a, 218b, ... 218n) in the warehousing layer (220e). The warehousing layer (220e) is generally the final stage of the system (200), where data is loaded into various systems to facilitate reporting, billing, or analysis. A data team may be responsible for various aspects of the warehousing, or it may be delegated to a data customer instead. Operations for a data team include loading, replication, and verification. In loading operations, the system (200) may need to load the data into a data warehouse (e.g., an Oracle or Druid data warehouse) or place the data onto a shared drop box or similar system. In replication operations, the system (200) may need to replicate a data feed to another data processing (e.g., Hadoop) cluster in a different co-location. In a verification operation, the system (200) may need to verify that the data loaded into a warehouse (218a, 218b, ... 218n) accurately matches the original fact feed (210) (i.e. certify there was no data loss).

As illustrated, in some embodiments, data bypasses the packaging layer (220d). In these embodiments, the core pipeline (210) streams output directly to a real-time data warehouse (216). In the illustrated embodiment, the real-time data warehouse (216). In the illustrated embodiment, the system (200) may use a real-time data warehouse (216) for reporting or similar functions that do not require high data accuracy.

FIG. 3 is a block diagram illustrating a pipeline factory according to some embodiments of the disclosure.

In the illustrated embodiment, a data highway (204) delivers events from one or more event emitters (not illustrated) to a factory layer (220c) and raw event storage (302). The description of FIG. 2 provides further detail regarding the data highway (204) which is not repeated herein.

In the illustrated embodiment, the raw event storage (302) may comprise a distributed file system (e.g., HDFS). In one embodiment, the system (300) writes raw events to the raw event storage (302) as they are received. In some embodiments, the system (300) writes the raw events to raw event storage (302) in a batch mode. That is, the system (300) writes a separate file for each batch period (e.g., one hour), the file including all events received during that period. In some embodiments, not illustrated, external consumer systems can access the raw event storage (302) to perform batch processing. Thus, in some embodiments, the raw event storage (302) can be used to provide backwards compatibility with existing batch pipelines.

As illustrated, a stream processor (304) receives events from the data highway (204). In one embodiment, the stream processor (304) comprises a distributed stream processor. In one embodiment, the stream processor (304) comprises a streaming topology that defines data processing stages to perform on events.

One example of a stream processor (304) is an Apache® Storm topology. Briefly, a Storm topology is a graph of inputs and processing nodes. The topology receives events as input streams. Each event in the input stream comprises a tuple and the input stream itself is an unbounded series of such tuples. The topology receives streams from input sources, referred to as "spouts." The topology performs all processing in individual processing nodes, referred to as "bolts." The topology defines the input to a bolt as either a spout or another bolt. Thus, the topology defines connects between spouts and bolts. The output of one or more bolts forms the output of the topology.

In the illustrated embodiment, the stream processor (304) performs any or all of the processing operations described in the description of core pipeline (210) in FIG. 2. Details of these operations are not repeated herein. Importantly, the stream processor (304) ensures that a given event received over the data highway (204) is output at most once to the streaming queue(s) (306). Thus, during processing, the stream processor (304) detects and drops any duplicated events. FIG. 4 provides further detail regarding specific techniques for performing this detection and dropping.

As illustrated, the stream processor (304) outputs the processed and de-duplicated event stream to one or more streaming queues (306). In one embodiment, the streaming queues (306) comprise one or more Apache® Kafka queues. Since the event stream is processed by the stream processor (304), the data stored in the streaming queues (306) can be considered as source of truth for downstream consumers. Thus, a low-latency consumer system (206) can directly access the streaming queues (306). In this manner, the system (300) can simulate a fully streaming pipeline. As will be discussed, since the stream processor (304) processes the event stream and ensures that no records are dropped or duplicated, the simulated stream in the streaming queues (306) is more accurate than a raw event stream. Furthermore, as will be discussed, the output of the stream processor (304) includes the results of more complicated or advance operations (e.g., joins or dimensional annotation) which are not possible using traditional stream processing techniques.

A spooler (308) and auditor (310) use the output of the stream processor (304) to support advanced operations by the stream processor (304). FIG. 4 provides more detail regarding the spooler (308) and reference is made to that description.

In one embodiment, the spooler (308) comprises a second stream processor. The spooler (308) ensures that a one-to-one mapping between streamed data and data written to the fact feed (210) exists. The spooler (308) also ensures that streaming events retrieved from the queues (306) appears exactly once in the fact feed (210) (i.e., no events in the queues, 306, are duplicated). As such, the spooler (308) may comprise a separate stream topology similar to the stream processor (304). In contrast to the stream processor (304), the spooler (308) reads events from the streaming queues (306). Thus, the event stream to the spooler (308) comprises the processed events. As illustrated, prior to writing to the fact feed (210), the spooler (308) outputs to the auditor (310) via a buffer (312). In one embodiment, the output of the spooler (308) comprises a flat file (e.g., an HDFS file) and the buffer (312) comprises a distributed file system such as HDFS. In one embodiment, this flat file comprises a set of events occurring in a given batch period. Thus, the flat file simulates batch processing, but using the streaming events.

In the illustrated embodiment, an auditor (310) receives the output of the spooler (308). As described above, in some embodiments, the output of the spooler (308) comprises a batch file of events. In the illustrated embodiment, the auditor (310) also accesses raw event storage (302). In one embodiment, the format of the raw event storage (302) and the output of the spooler (308) are the same. For example, spooler (308) may write flat files to HDFS buffer (312) and raw event storage (302) may comprise raw events stored in the same type of file (e.g., HDFS). In the illustrated embodiment, the auditor (310) retrieves a batch file from buffer (312). In one embodiment, this batch file is associated with a fixed period. In some embodiments, this fixed period is represented in the filename or in metadata. Using this fixed period, the auditor (310) then retrieves a set of events from the raw event storage (302) matching the fixed period. In one embodiment, the periods of the buffer (312) and the raw event storage (302) are synchronized. In this embodiment, the auditor (310) then retrieves a single file from the raw event storage (302) that matches the period pulled from the buffer (312). In other embodiments, the auditor (310) may execute a MapReduce job to identify events split across multiple files. In this embodiment, the periods represented by files in the raw event storage are not synchronized with the buffer (312). Thus, the auditor (310) must patch together portions of multiple files stored in raw events storage (302) to rebuild a period of raw events matching the period stored in the buffer (312). In either event, the auditor (310) receives two files containing raw events from raw event storage (302) and a set of processed events for the same period stored in buffer (312).

In general, the auditor (310) ensures that each processed event in the buffer (312) matches a raw event stored in raw event storage (302). Thus, the auditor (310) ensures that no events were dropped during processing by the stream processor (304) and that no events were duplicated. If the auditor (310) detects that an event exists in the raw event storage (302) and does not exist in the corresponding buffer (312) output, the auditor (310) sends the missing event back to the stream processor (304) for re-processing.

The stream processor (304) reprocesses the events using the same processing logic used to process the event originally. In some embodiments, the stream processor (304) may add a field to the reprocessed event to indicate it was (or will be) reprocessed. In most embodiments, the stream processor (304) will properly process the event during re-processing. However, if the stream processor (304) cannot reprocess the event (as detected by the auditor, 310), the system (300) may gracefully handle the error. In one embodiment, the auditor (310) can itself add a field to the raw event indicating that the raw event was not processed and write the event along with the processed events.

After any missing events are re-processed, the auditor (310) writes the final output to the fact feed (210). Since spooler (308), buffer (312) and auditor (310) operate on batches of events, the fact feed (210) comprises a simulated batch data store. In some embodiments, the auditor (310) will delay writing to the fact feed (210) until any events are re-processed. In other embodiments, the auditor (310) writes the partially final output file to the fact feed (210) and updates the file upon completing the re-processing.

FIG. 4 is a block diagram illustrating a core pipeline according to some embodiments of the disclosure. Various elements of FIG. 4 are described in the previous figures and those elements are not described again herein.

In the illustrated embodiment, a stream processor (304) receives events from a data highway (204). In the illustrated embodiment, the stream processor (304) receives events from the data highway (204) via an initial spout (404). The stream processor (304) as illustrated includes two separate spouts (404, 422). In the illustrated embodiment, the stream processor (304) utilizes two spouts (404, 422) to distinguish between event streams (e.g., original versus re-processing). In the illustrated embodiment, the stream processor (304) topology can be configured to add additional extract-transform-load (ETL) steps (e.g., bolts) for the reprocessing spout (422) versus events received via the initial spout (404).

In the illustrated embodiment, the stream processor (304) processes events received via spouts (404, 422) via ETL logic (406). As described previously, ETL logic (406) may comprise a series of linear processing stages (e.g., bolts) for each operation performed on events.

In the illustrated embodiment, the ETL logic (406) outputs processed events to two streaming queues (408a, 408b). In one embodiment, the two queues (408a, 408b) store varying types of event data. As illustrated, a first queue (408a) is accessed by a partial stream consumer system (424). In the illustrated embodiment, the first queue (408a) may be filled by the ETL logic (406) prior to the execution of all processing steps. In the illustrated embodiment, the ETL logic (406) may eschew more complicated and time-consuming operations and interrupt the full processing steps to provide low latency operations. In some embodiments, this bypassing includes foregoing joins, traffic protection, annotation, etc. In the illustrated embodiment, the partial stream consumer system (424) may comprise a fast feedback system such as budget or pacing systems that are willing to accept a certain level of error. Thus, the first queue (408a) provides "best effort" data wherein the system (400) does not guarantee the accuracy of the data. In practice, however, the system (400) will generally process a large amount of data correctly enough that the best effort data in the first queue (408a) is of value to the partial stream consumer system (424).

In contrast to the first queue (408a), the stream processor (302) fills the second queue (408b) with the results of the full ETL processing. Thus, the ETL logic (406) fully processes the data in the second queue (408b), including performing joins, deduplication, annotations, fraud detection, traffic protection, etc. In one embodiment, the complete streaming consumer system (426) access second queue (408b) can retrieve data that achieves close to exactly once performance (that is, no events are dropped or duplicated) since the data was fully processed in the ETL logic (406). In some embodiments, this performance will meet "exactly once" performance. However, in other embodiments, the output of the second queue (408b) is still subject to inaccuracies caused by the underlying messaging queue. In some embodiments, a near exactly one completeness from second queue (408b) comprises a 99.9% guarantee of completeness. Such a confidence level is often suitable for applications such as real-time reporting.

Finally, as illustrated and discussed above, a final fact feed (210) meets exactly once requirements of all systems and provide batch-like performance. That is, data in the fact feed (210) will be fully de-duplicated and ensure that no events were dropped. As discussed in FIG. 3, this guarantee is implemented via spooler (308) and auditor (310). Auditor (310) is described more fully in FIG. 3 and those details are incorporated herein by reference.

In the illustrated embodiment, the spooler (308) is illustrated as including deduplication writer (412), deduplication store (414), and a fact feed writer (416).

In the illustrated embodiment, the deduplication writer (412) receives events from the second queue (408b). An event is uniquely identified by an event identifier (event_id). The spooler (308) considers two events as duplicates if they have the same event identifier. Events may include additional, but standardized, fields such as a type, timestamp, join status, and secondary event identifiers.

The deduplication writer (412) writes each of the events to deduplication store (414). In one embodiment, the store (414) comprises a database such as HBase or a similar storage device. Upon receiving an event, the writer (412) analyzes the fields associated with the event. If the event includes one or more secondary event identifiers, the writer (412) will retrieve all events stored in store (414) matching these secondary event identifiers and update the entries to indicate that a primary event is available (i.e., will be written to the store, 414). The writer (412) will then write the received event to the store (414) using the event identifier as a key. In some embodiments, a salt will be added to the event identifier before using the event identifier as a key. In the illustrated embodiment, the writer (412) will not write the event if the event has secondary event identifiers and the initial step of updating the secondary events is not successful. In some embodiments, the writer (412) will serialize the event prior to writing the event as a value for the event identifier key.

In the illustrated embodiment, the deduplication store (414) stores events per batch period and per type of event. In some embodiments, the store (414) creates a new table for each event type and batch period pair for a fixed period of time (e.g., one week) since the current time. The store (414) additionally includes a pruning process that periodically inspects the created tables and removes older tables not occurring within the current period (e.g., older than one week). In some embodiments, the auditor (310) initiates this pruning process upon confirming that all data for a given period is certified.

The spooler (308) additionally includes a fact feed writer (416). In the illustrated embodiment, the fact feed writer (416) waits for a signal from auditor (310) to trigger a spooling process to write the events in the store (414) to the fact feed (210) for a particular batch period and event type. In one embodiment, the fact feed writer (416) includes an internal web server that comprises a Hypertext Transfer Protocol (HTTP) endpoint that is called by the auditor (310) to initiate the spooling. As described above, once the auditor (310) confirms that the data in the store (414) is fully processed and certified, the auditor (310) issues a call to the endpoint which causes the writer (416) to start writing to the fact feed (210). In one embodiment, the writer (416) executes a distributed process routine to per from a full table scan of the store (414) and write the events to the fact feed (210).

For each event in the store (414), the writer (416) will deduplicate the events prior to writing. In one embodiment, the writer (416) will first determine if an event has one or more secondary identifiers and whether that secondary event was successfully joined to the event under inspection. If so, the writer (416) will select the most recent secondary event and write that joined event to the fact feed (210). Alternatively, if the event under inspection indicates that a primary event is available, the writer (416) will skip the event (since a root event exists). Finally, if the event does not have secondary identifiers and the primary event flag is not raised, the writer (416) will write out the event as failed since the secondary event was not properly joined.

In some embodiments, low-latency consumers may not want to or be able to consume a low-latency stream (408a) directly. For example, the stream might contain personally-identifiable fields that need to be restricted to specific consumers or the final consumer may need additional processing of events for their use. As another example, the consumer may be consuming from many sources and is unable to handle different event schemas of their various inputs. In these scenarios, the system (400) provides derived low-latency streams, or "filters", that have all of the events (or at least all of the desired events) as the second queue (408b) stream. Each filter can be associated with a quality of service (QoS) level. In the illustrated embodiment, three QoS levels are provided: "at least once", "at most once", and "at least once with tag."

A filter having an at least once QoS outputs every event but potentially includes duplicates. In the event of a system (400) failure, the at least once filter resends previously-sent events. A filter having an at most once QoS does not include duplicates but potentially drops data. The at most once filter does not reprocess the same event batch more than once.

Finally, a filter having an at least once with tag QoS generates batch dataset wherein each event in the batch includes tags allowing downstream consumer systems to detect duplicates. In one embodiment, this filter includes a stream topic, partition, and a "cursor," that can be used to detect duplicates. In some embodiments, Kafka offsets and CMS Message Ids could provide such cursors. The consumer system is then responsible for keeping track of the last cursor it processed, and discard any subsequent batch with a cursor less than or equal the new batch. This requires a 1-to-1 correspondence between batches in the pipeline and derived streams.

Each of the above filters may be implemented via a separate stream processor (e.g., stream topology). In these embodiments, the filters utilize an output of the system (400) (e.g., queues 408a, 408b) as an input source (e.g., spout) and output the filtered feed.

For the at least one filter, the filter will always back up in the event of a failure and resend any events that cannot be confirmed as being successfully delivered. This filter uses the initial spout (404) and streaming queue (408b) as inputs (e.g., filter spouts). In this embodiment, the consumer is configured to not report its current read offset. When sending data, the filter spout includes the current events cursor in a message identifier. The receiver (e.g., sink) would then acknowledge the received message only after successfully delivering the filtered output to the derived stream. In some embodiments, the receiver could also use the existing spooler logic to fail a tuple if it can't deliver it, and then continue to fail subsequent tuples until it receives a restarting indication from the spout. Upon receipt of an acknowledgement, the filter spout would commit that cursor back to the system (400). On receipt of a fail of a sent event, the filter spout would back up the received offset to a cursor at or before the last acknowledged event and restart sending.

For the at most once filter, the filter spout enables automatically committing offsets in a stream queue. By turning on auto-commitment, the filter spout only transmits a given event once and does not re-transmit events causing duplication.

For the at least once with tag filter, the at least one filter mechanism can be used. However, in this filter, tags will be added prior to transmission to the consumer. These tags include the cursor, as described above, but also a topic and partition if they aren't implied by the derived stream's partition.

In some embodiments, an exactly once filter may be implemented based on the at least once with tag filter. In this embodiment, a receipt acknowledgement message can be saved as reliably as the system (400) can support. Additionally, the filter, on receipt of the acknowledgement, could update some persistent record of the delivered cursor. However, persisting this data may be computationally expensive and require significant storage. In an alternative embodiment, given the at least once with tag filter, the filter, on a start-up or after a failure, can access the output stream and read back a plurality of last-sent messages in the queue. The filter could then determine the tag of the last message written, then discard any replayed events from the spout until it was caught up, thus ensuring exactly once delivery.

In some embodiments, the use of a single auditor (310) in the foregoing figures may introduce latency to certain implementations of the system. Specifically, if it is known that a given pipeline (400) will perform an extensive number of join operations (e.g., joining more than three event streams together), a single auditor may introduce latency into the overall pipeline. In the pipeline (400), when a topology performs a join between a primary and secondary event, there is a requirement that the primary events for time interval X are completely audited by an auditor (310) before the secondary events can start to be processed for the same interval X In short, if the audit step for a given interval takes ten minutes, then this results in a ten-minute delay before the secondary events can be processed by the same auditor (310). If there are three event streams, the delay for tertiary events increases to 20 minutes, etc.

To solve this problem and provide faster speeds even in the case of multiple join phases, the disclosed embodiments describe a modified auditor system to allow for parallel audit cycles between primary and secondary event feeds. While described in the context of primary and secondary events, the disclosed embodiments may be extended to any number of events. The disclosed embodiments allow for joins of many feeds to occur in parallel with minimal overhead, while also leveraging the accuracy and speed of the other components of the pipeline (400) described above.

Figure 5:
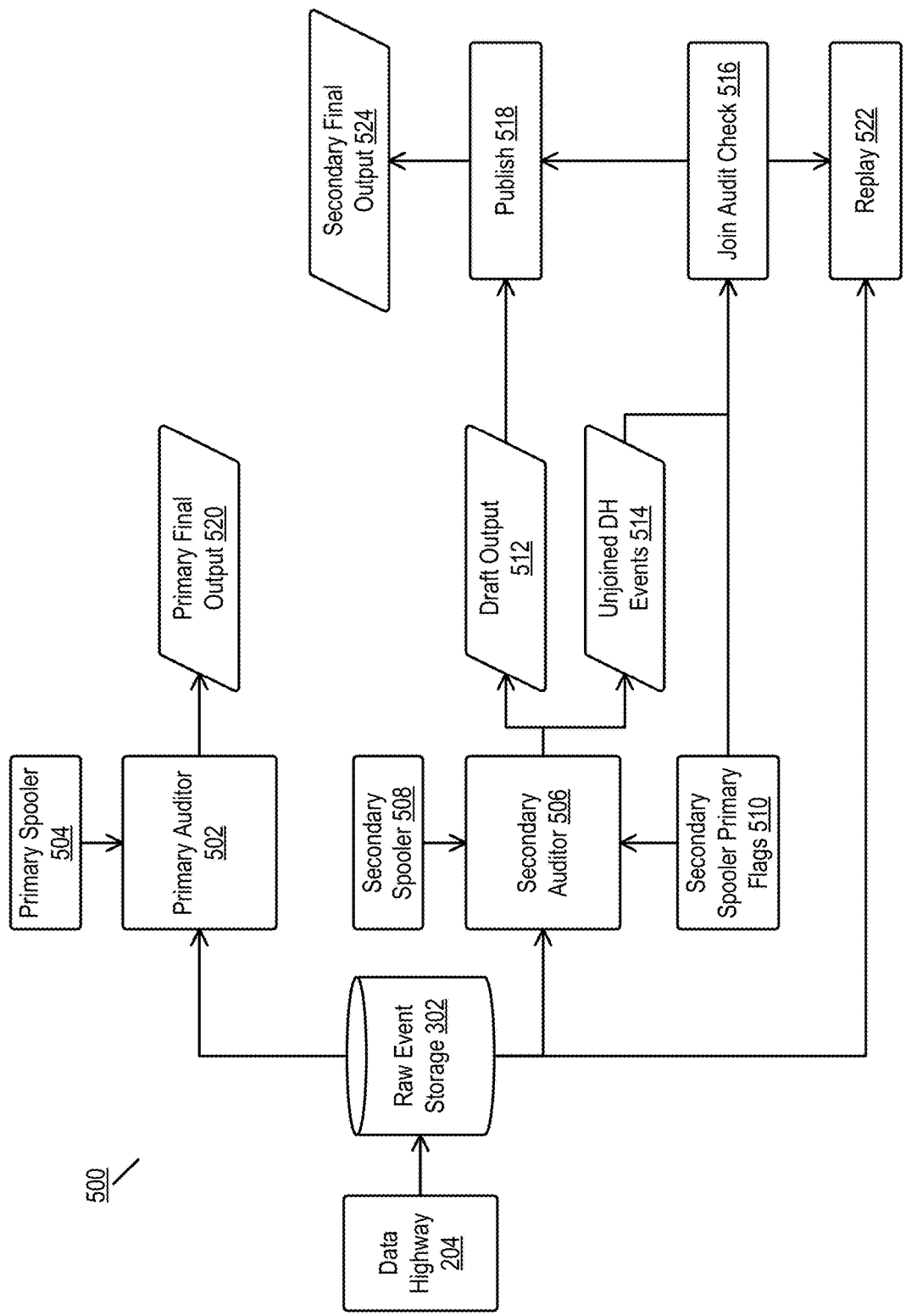
FIG. 5 is a block diagram illustrating an alternative auditor system according to some embodiments of the disclosure.

FIG. 5 is a block diagram illustrating an alternative auditor system according to some embodiments of the disclosure.

By use of the auditor (310) and spooler (308), the pipeline (400) guarantees that for a given time interval X, if two replay-able and joinable events P (primary) and S (secondary) are emitted from the pipeline (400), then the pipeline (400) guarantees that event S will be properly annotated by event P (though it may produce a temporary unannotated event S and replace it with a replayed annotated one at a later time). That is, the pipeline (400) will not produce an unannotated secondary event if the primary event it was to be joined with was also produced on time. For example, given a click/impression join where the user saw impression P and then clicked on the impression to produce click S, the pipeline (400) should never produce impression P and an un-joined click S, no matter what order the events arrive and no matter what failures occur in the pipeline.

In some embodiments, the stream processor (304) includes a buffer for managing the state of primary and secondary events. If a primary event is received first, it is processed and emitted by the pipeline (identified herein as P). It is also cached for the incoming secondary event. When the secondary event is received it is annotated with the cached primary and emitted as a fully annotated secondary event (identified herein as S⁺). By contrast, in the out-of-order scenario, the secondary is received first and processed and cached. The emitted value (identified as S⁻) comprises an unannotated (or lonely) secondary event and is, in some respects, an improper value. When the primary later arrives, the cached secondary is properly annotated and the processor (304) emits both P and S⁺. In some embodiments, when the stream processor (304) outputs the primary event in the out-of-order scenario, it additionally writes a flag to the event indicating it was processed out-of-order (this flag is referred to as a p-flag). At this stage, the spooler (308) and auditor (310) process the events to ensure that only S⁺ is written to the final fact feed as described above.

In the preceding pipeline (400), the only way for an audit to succeed and not produce a joined result is an out of order arrival (i.e., S before P) followed by a dropped secondary. If the fully annotated secondary event (S⁺) is then lost during processing (e.g. due to a system failure), then a normal audit of both feeds would succeed and the guarantee would fail.

However, in the illustrated embodiment, the auditor system (500) uses the specially marked primary causes a flag to detect that joining of the secondary was possible. However, if the p-flag was also dropped, the guarantee would fail. In some embodiments, the auditor system (500) ensures that the primary feed was audited first. If the primary feed succeeded at its audit, the design of the pipeline ensures that the p-flag will reach the secondary queue.

In the illustrated embodiment, two auditors (502, 506) are connected to and receive raw events from the raw event storage (302). These two auditors (502, 506) perform all of the functions described in connection with auditor (310) and those similar details are not repeated herein. In contrast to pipeline (400), a primary auditor (502) is configured to audit primary events while the secondary auditor (506) is configured to audit secondary events. In some embodiments, the primary auditor (502) may also be configured to process any events not requiring a join operation. As mentioned, the auditor system (500) may include third, fourth, etc. auditors.

In the illustrated embodiment, the auditors (502, 506) are communicatively coupled to primary and secondary spoolers (504, 508). These spoolers (504, 508) perform the same functions described with respect to spooler (308). However, as illustrated, each event type (primary, secondary) has its own respective spooler (502, 506). As described above, the auditors (502, 506) pull events to audit from the spoolers (504, 508) and compare these events to the corresponding raw data from raw event storage (302). In contrast to pipeline (400), the secondary auditor (506) is additionally coupled to a secondary spooler primary flag source (510). In the illustrated embodiment, the secondary spooler primary flag source (510) comprises a data feed that consists of the p-flags generated during processing. Specifically, when the stream processor (304, not illustrated in FIG. 5) processes an out-of-order join, the processor (304) adds a flag indicating as such (a p-flag). In the illustrated embodiment, the secondary spooler primary flag source (510) comprises a fact feed of just these p-flags. In some embodiments, the secondary spooler primary flag source (510) also include a join key or other identifier. In contrast, to spooler (508), the secondary spooler primary flag source (510) is significantly lighter weight and enables quicker processing of p-flags (discussed below).

In the illustrated embodiment, the primary auditor (502) outputs a final primary output (520) after auditing (and replaying, if necessary). In the illustrated embodiment, this primary fact feed comprises part of the fact feed (210). In one embodiment, the fact feed (210) may comprise a set of files corresponding to both batch intervals and event types. Thus, the output (520) may comprise a certified file for a primary event type in a given interval. In contrast to secondary events, the primary events may be certified immediately (or after replays) and do not require further join processing.

Although illustrated as a single process, the primary auditor (502) may include one or more replay loops whereby primary events are replayed. In the illustrated embodiment, the primary auditor (502) should create a persistent signal as to whether or not any primary event was replayed at any replay level. As used herein, an audit is "clean" if no replays were necessary at any level. In some embodiments, this information may be stored in a separate database (not illustrated) with a clean flag that is initialized with true when the interval is started. If at any point a replay is required, the flag is updated to false. In addition, the primary auditor (502) will record the timestamp of when the audit finished.

In contrast, the output of the secondary auditor (506) comprise a draft output (512). This draft output (512) may be stored in a temporary location on disk separate from the certified events. The auditor (506) also outputs a second set of raw data highway (DH) events that were not properly joined (e.g., lonely events).

In the illustrated embodiment, there is no dependency between when the primary auditor (502) and secondary auditor (508) start. In one embodiment, the secondary auditor (508) will create an auxiliary feed (514) containing the raw data highway records, this feed (514) includes all un-joined secondary events present in the raw data. In some embodiments, the entire raw event record is output so that the attributes are ready for replay if necessary. In some embodiments, the secondary auditor (508) should record the timestamp that the audit began in the database described above with respect to monitoring replay levels.

In the illustrated embodiment, the auditor system (500) additionally includes a join audit check (516). In the illustrated embodiment, the join audit check (516) comprise the second phase of auditing of secondary events while the auditor (508) comprises the first phase. In the illustrated embodiment, this second phase of auditing the secondary events begins after the primary auditor (502) has published the final output (520) and after the secondary auditor (508) has completed the draft (512) and un-joined auxiliary file (514). That is, the join audit check (516) must await the first phase secondary auditor (508) to complete and the primary auditor (502) to complete. Additionally, the join audit check (516) waits for the secondary spooler primary flag source (510) to account for all replayed primaries replayed during the primary audit.

In some embodiments, the join audit check (516) must await every primary audit in every prior interval of the join window. For example, if the join look back window is one hour, then the second phase of secondary auditing for five-minute interval 11:55 must depend on the primary audit being completed for all primary events from 11:00 to 11:55.

The join audit check (516) begins by checking the primary clean flag for all primary intervals whose audit completed after the secondary audit began. If a primary audit completed before the secondary started, then there will be no new p-flags written from that interval. Thus, the check is unnecessary unless there exists at least one primary interval in the join window which was not clean (issued replays) and its audit did not complete until after the current secondary audit started. If no such un-clean audit exists, then the join audit check phase may short circuit and report a pass.

Otherwise, there may be p-flags in the current interval that were not considered. If at least one interval was dirty, then the join audit check should proceed by performing an inner join on the p-flag feed and the auxiliary feed. If the inner join fails to produce any joined records, then the audit will have passed. If the inner join produces any records, then the data highway record from the join should be written out to a replay queue and the join check should fail.

If the result of the join check passes, then control should be passed to a publishing step (518) which moves the draft secondary feed (512) to the final published location (524). Upon a failed join check, the audit will be considered a failure and the replay mechanism (522) should replay everything in the replay queue, and then the entire audit from the secondary start should be retried just like normal.

Figure 6A:
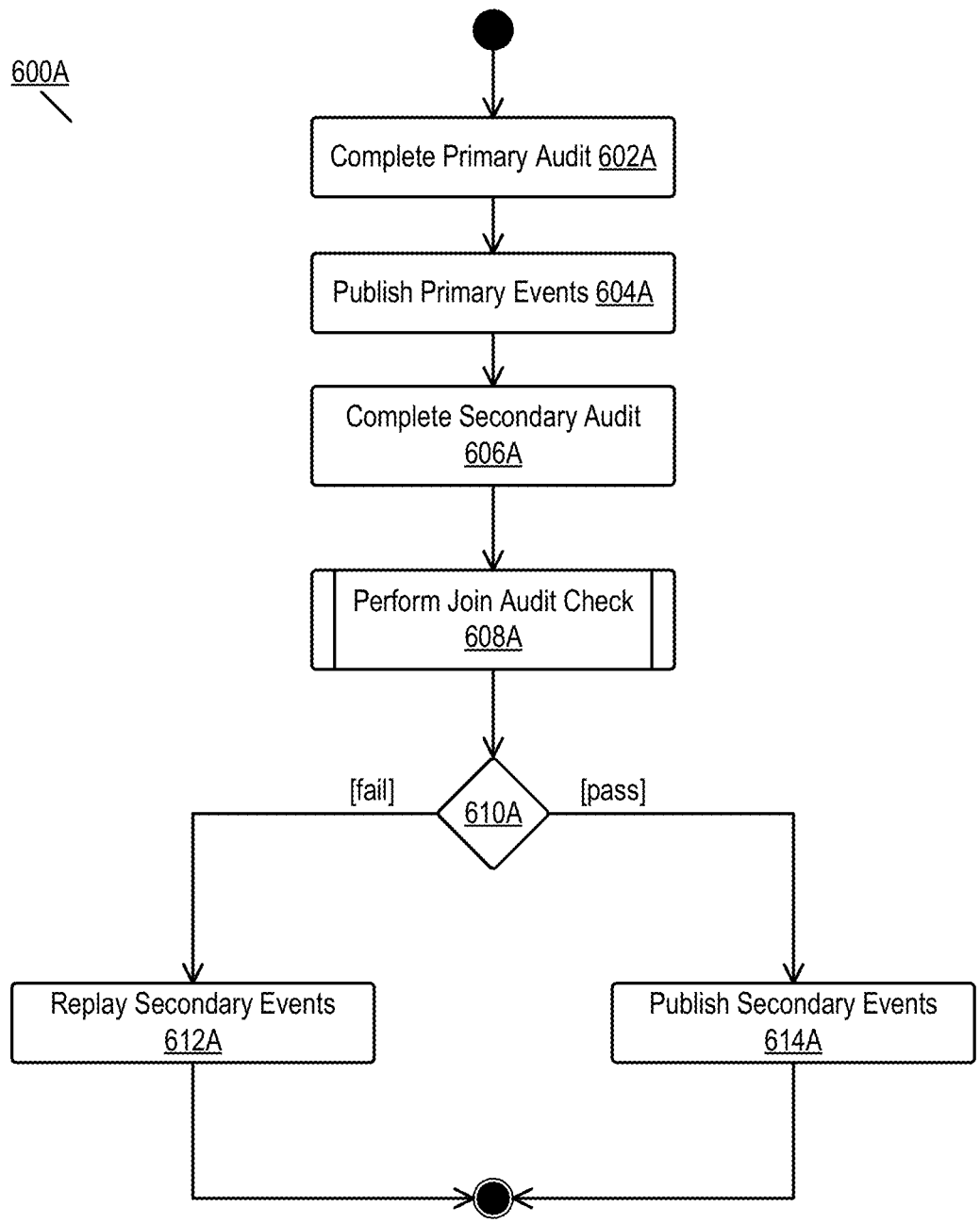
FIG. 6A is a flow diagram illustrating a method for performing a parallel audit of events according to some embodiments.

FIG. 6A is a flow diagram illustrating a method for performing a parallel audit of events according to some embodiments.

As will be discussed, when both initial audits (referred to as existence audits) for primary and secondary events are complete for a given interval, it can be confirmed that all events that need to be written out by the pipeline have been spooled. Thus, the only reason to replay the secondary events all events were received is if, for a given secondary event identifier, there exists a p-flag and no joined secondary. In this scenario, the fully annotated secondary event was dropped by the pipeline (400). For any given event identifier, there are only certain combinations of records that can occur. Before discussing the operation of the methods (600a, 600b), the following table is provided that summarizes the possible combinations that the methods (600a, 600b) handle.

TABLE 1

| # | Raw S (DH) | S⁻ | S⁺ | p-flag | Note | Replay or Emit |
|---|---|---|---|---|---|---|
| 1 | True | False | False | False | Existence check failed | Replay S |
| 2 | True | False | False | True | Existence check and join check fails | Replay S |
| 3 | True | False | True | False | Joined record exists | Emit S⁺ |
| 4 | True | False | True | True | Joined record exists | Emit S⁺ |
| 5 | True | True | False | False | No join possible | False, emit S⁻ |
| 6 | True | True | False | True | Join check failed | Replay S |
| 7 | True | True | True | False | Joined record exists | Emit S⁺ |
| 8 | True | True | True | True | Joined record exists | Emit S⁺ |

In Table 1, the column "Raw S (DH)" refers to the presence of the secondary event S in the raw event store and is set to true for all cases. The column S⁻ refers to the presence of an un-joined secondary event in the secondary event feed stored by the secondary spooler (506) and processed by the secondary auditor (506). The column S⁺ refers to the presence of a fully annotated secondary event stored by the secondary spooler (506) and processed by the secondary auditor (506). The column p-flag refers to whether a p-flag was raised in the secondary spooler primary flag source (510) for a corresponding secondary event. The note column summarizes the case and indicates whether the joined record properly exists in the draft output (512), whether the existence check (initial audit) failed, whether the join audit check (516) failed, or whether no join was possible.

As indicated in Table 1, there are three cases (#1, #2, and #6) where a replay is required. The first two conditions (#1 and #2) are failures of the existence check and are not influenced by the p-flag. That is, in both cases, the secondary was wholly absent from the secondary spooler feed and thus the event should be replayed. The third replay condition (#6) is influenced by the p-flag. Specifically, since S⁻ was found and the p-flag was raised, the system expects that S⁺ should have been present during the out-of-order annotation. Similarly, case #5 can only be reached if it is known that all p-flags have been emitted, or rather that the primary audits have completed. Thus, it is this condition that needs to be reviewed by the second phase of the secondary event audit. In other words, the conditions for #5 may be a false positive for case #6 if the p-flags are missing. P-flag existence is guaranteed by the primary audit, and thus, case #5 cannot be confirmed as a true #5 until primary audit is completed.

The most common reason without a node failure or similar issue is that the primary event is not delivered in time to the pipeline by data highway. If the primary is lost somehow, then primary audit will replay it. If the secondary audit is in progress, then it will not consider the p-flag from the missing primary and thus could detect case #5 instead of #6 and fail to replay. Therefore, all case #5s need to be reviewed after the primary audit completes.

In step 602a, the method (600a) completes a primary audit. In the illustrated embodiment, the primary audit comprises a comparison of the primary events processed by the system and is performed in the manner described in previous Figures. In brief, the primary audit confirms that each processed event corresponds to a raw event in the raw event store.

In step 604a, the method (600a) publishes a set of primary events. As discussed, the primary audit will publish a set of primary events after confirming the audit. In some embodiments, this publishing will be performed after one or more replays of the primary events.

In step 606a, the method (600a) completes a secondary audit. In one embodiment, although illustrated as occurring after the primary audit, the secondary audit may be started irrespective of the primary audit. That is, there is no dependency between the primary and secondary audit starts. In the illustrated embodiment, the secondary audit may be performed in a manner similar to the primary audit, albeit for secondary events. However, as part of 606a, the method (600a) generates an auxiliary feed containing the raw data highway records that satisfy case #5 above. That is, the method (600a) in step 606a creates a feed of S⁻ events that do not include a corresponding p-flag raised. In some embodiments, the contents of the feed include the raw event fields from the corresponding raw event record (that is, the unprocessed event fields in addition to the processed event fields)

In step 608a, the method (600a) performs a join audit check. In the illustrated embodiment, the output of the join audit check is a pass or fail. Details of the generation of this pass or fail result are provided in the description of FIG. 6B which is not repeated herein. As will be described in FIG. 6B, the inputs to the join audit check include the auxiliary feed generated in step 606a as well as the outputs of the primary and secondary audit generated in step 602a, 604a. Thus, while the primary and secondary audits are not dependent to start in a specific sequence, the processing in step 608a must await the results of these feeds. Further, the method (600a) must await the replay of all primary events to generate a complete listing of p-flags.

In step 610a, the method (600a) receive the output of the join audit check performed in step 608a and branches based on the result.

In step 612a, the method (600a) replays the secondary events if the join audit check signals a failing result. In one embodiment, the method (600*a*) generates a list of errantly un-joined secondary events in step 608*a* and transmits these un-joined events to a replay mechanism. The replay mechanism then re-processes the un-joined events through the pipeline and the method (600*a*) repeats.

Alternatively, in step 614*a*, the method (600*a*) publishes the results of the secondary audit if the join audit check signals a pass. In this scenario, the join audit check signals that all of the events were properly joined. In some embodiments, this determination is made based on a threshold. That is, the join audit check may determine if the number of failed joins is below a threshold. If so, the method (600*a*) publishes the results of the secondary audit. In one embodiment, publishing the results of the secondary audit comprises copying the results of the secondary audit to a final published location in a distributed file system.

Figure 6B:
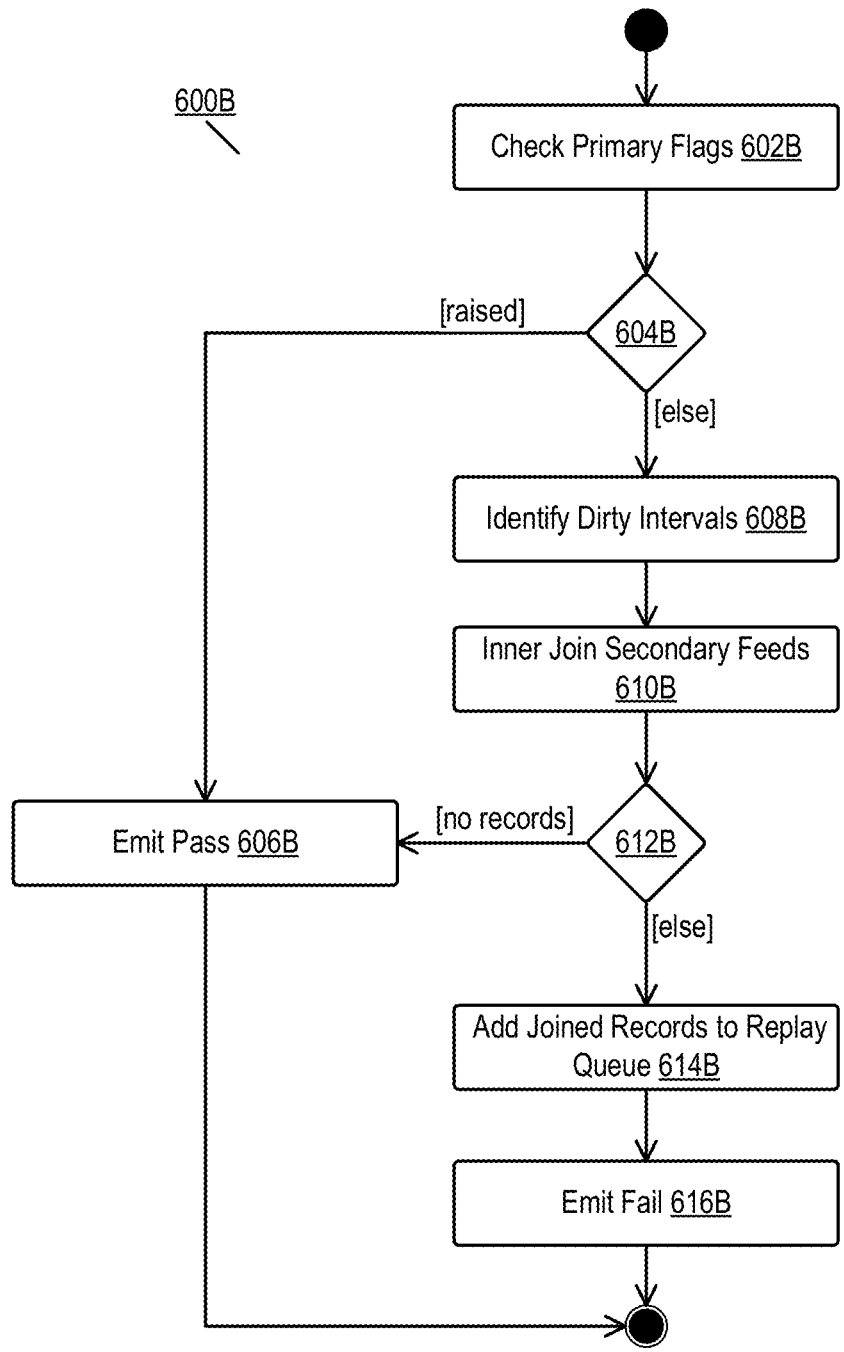
FIG. 6B is a flow diagram illustrating a method for performing a joint audit check according to some embodiments.

FIG. 6B is a flow diagram illustrating a method for performing a joint audit check according to some embodiments.

In step 602*b*, the method (600*b*) checks the p-flags for all primary event intervals whose audit completed after the secondary audit began. If a primary audit completed before the secondary started, then there will be no new p-flags written from that interval. Thus, the check is unnecessary unless there exists at least one primary interval in the join window which was not clean (i.e., issued replays) and its audit did not complete until after the current secondary audit started.

In step 604*b*, the method (600*b*) branches based on the foregoing check. If no such un-clean audit exists, then the method (600*b*) may short circuit and report a pass signal (606*b*). Otherwise, the method (600*b*) proceeds to perform the full join audit check.

In step 608*b*, the method (600*b*) identifies one or more dirty intervals. In the illustrated embodiment, a dirty interval refers to an interval in a join window that includes one or more raised p-flags for a corresponding un-joined (S$^-$) event. As described above, in some scenarios, the secondary existence audit may detect the presence of S$^-$ and no raised p-flag, which would indicate a lonely secondary event. However, during replay (or at some other point in the join window) the p-flag may be raised but S$^+$ not found, indicating that S$^+$ was lost after joining. If this occurs, the window including the event with the raised p-flag is deemed "dirty."

In some embodiments, the method (600*b*) may not identify any dirty intervals. In this scenario, the method (600*b*) may emit the lonely event (S$^-$) as the proper output.

In step 610*b*, after identifying at least one dirty interval the method (600*b*) performs in inner join on the p-flag feed and the auxiliary feeds. As described above, the auxiliary feed includes all raw secondary events (S$^-$) satisfying case #5 while the p-flag feed will include lonely secondary events with raised p-flags. Thus, the inner join operation produces the overlap of these two feeds. That is, the inner join will include all S$^-$ in the auxiliary feed that also correspond to events with a raised p-flag. If all events were replayed and corrected, the result of the inner join will be equal to the auxiliary feed. If some events were not properly replayed, the result will be a subset of the auxiliary feed. In some embodiments, the inner join is performed on a shared join key.

In step 612*b*, the method (600*b*) determines if any records resulted from the inner join. If the inner join fails to produce any joined records, then the audit will have passed and the method (600*b*) will emit a pass signal (606*n*). In the illustrated embodiment, the lack of records indicates that any lonely events in the auxiliary feed are, in fact, lonely secondary events and should be persisted as such.

In step 614*b*, however, the method (600*b*) detects one or more records in the inner join result. The presence of events in the inner join results means that at least one lonely event (S$^-$) matched a later-identified p-flag. In this scenario, the method (600*b*) determines that the annotated event (S$^+$) was dropped by the pipeline. The method (600*b*) then adds the raw secondary event record from the data highway to a replay queue for reprocessing and emits a fail signal in step 616*b*. As described, the fail signal will prevent certification of the secondary event data and the missing events will be re-processed. In some embodiment, the methods (600*a*, 600*b*) will certify a partial event set an only re-process those events resulting from the inner join.

Figure 7:
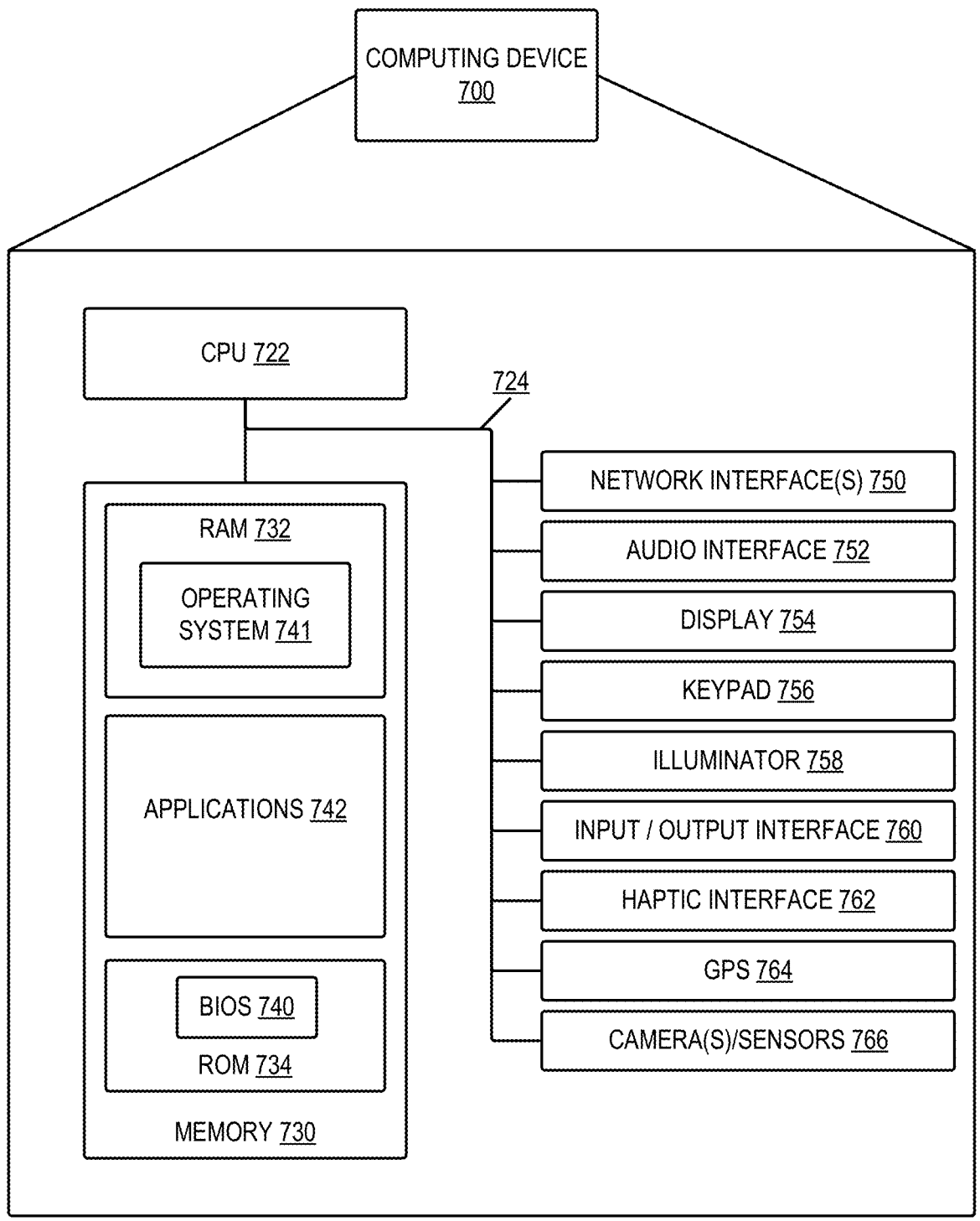
FIG. 7 is a schematic diagram illustrating a computing device showing an example embodiment of a client or server device used in the various embodiments of the disclosure.

FIG. 7 is a schematic diagram illustrating a computing device showing an example embodiment of a client or server device used in the various embodiments of the disclosure.

The computing device (700) may include more or fewer components than those shown in FIG. 7. For example, a server computing device may not include audio interfaces, displays, keypads, illuminators, haptic interfaces, GPS receivers, cameras, or sensors.

As shown in the figure, the device (700) includes a processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766), or a plurality of cameras/sensors (766), as understood by those of skill in the art. The positioning of the camera(s)/sensor(s) (766) on the device (700) can change per device (700) model, per device (700) capabilities, and the like, or some combination thereof.

The computing device (700) may optionally communicate with a base station (not shown), or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises input/output interface (760) for communicating with external devices, using communication technologies, such as USB, infrared, Bluetooth™, or the like. The haptic interface (762) provides tactile feedback to a user of the client device.

Optional GPS transceiver (764) can determine the physical coordinates of the computing device (700) on the surface of the Earth, which typically outputs a location as latitude and longitude values. GPS transceiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may through other components, provide other information that may be employed to determine a physical location of the device, including, for example, a MAC address, Internet Protocol (IP) address, or the like.

Mass memory (730) includes a RAM (732), a ROM (734), and other storage means. Mass memory (730) illustrates another example of computer storage media for storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from hard disk drive (not illustrated) and temporarily stored in RAM (732) by CPU (722). CPU (722) may then read the software or data from RAM (732), process them, and store them to RAM (732) again.

For this disclosure, a module is a software, hardware, or firmware (or combination thereof) system, process or functionality, or component thereof. A module performs or facilitates the processes, features, or functions described herein (with or without human interaction or augmentation). A module can include sub-modules. Software components of a module may be stored on a computer-readable medium for execution by a processor. Modules may be integral to one or more servers or be loaded and executed by one or more servers.

The terms "user," "subscriber," "consumer" or "customer" refer to a user of an application or applications as described herein or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

One of skill in the art may implement the methods and systems of the present disclosure in many manners. As such, the disclosed embodiments are not to be limited by the preceding exemplary embodiments and examples. In other words, functional elements being performed by single or multiple components, in various combinations of hardware and software or firmware, and individual functions, may be distributed among software applications at either the client level or server level or both. In this regard, one may combine any number of the features of the different embodiments described herein into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces. The scope of the present disclosure may also cover variations and modifications made to the hardware or software or firmware components described herein as would be understood by those skilled in the art.

Furthermore, the embodiments of methods presented and described as flowcharts in this disclosure are provided by way of example to provide a complete understanding of the technology. The disclosed methods are not limited to the operations and logical flow presented herein. Alternative embodiments exist that alter the order of the various operations or include independent sub-operations that are part of a more extensive operation.

While the disclosure describes various embodiments, such embodiments should not limit the teaching of this disclosure to those embodiments. Various changes and modifications may be made to the elements and operations described above to obtain a result that remains within the scope of the systems and processes described in this disclosure.

What is claimed is:

1. A method comprising:
   completing a first audit for a primary event type, the first audit generating a set of primary events;
   completing a second audit for a secondary event type, the second audit generating a draft set of secondary events and an auxiliary feed of un-joined secondary events;
   performing a join audit check on the auxiliary feed of un-joined secondary events and a set of flags, each flag in the set of flags indicating that a respective un-joined secondary event was properly joined; and
   replaying a subset of the un-joined secondary events in the auxiliary feed upon determining that the join audit check failed.

2. The method of claim 1, further comprising publishing the set of primary events after completing the first audit.

3. The method of claim 1, further comprising certifying the draft set of secondary events upon determining that the audit check passed.

4. The method of claim 1, the performing a join audit check further comprising performing an inner join operation on the auxiliary feed and the set of flags.

5. The method of claim 4, the performing an inner join operation comprising performing an inner join based on a shared join key.

6. The method of claim 4, the replaying the subset of the un-joined secondary events comprising adding a result set of the inner join operation in a replay queue.

7. The method of claim 1, the performing the join audit check further comprising identifying a dirty interval, a dirty interval comprising an interval in a join window that includes one or more raised flags in the set of flags for a corresponding un-joined secondary event.

8. An apparatus comprising:
   a processor; and
   a storage medium for tangibly storing thereon program logic for execution by the processor, the stored program logic causing the processor to perform the operations of:
      completing a first audit for a primary event type, the first audit generating a set of primary events;
      completing a second audit for a secondary event type, the second audit generating a draft set of secondary events and an auxiliary feed of un-joined secondary events;

performing a join audit check on the auxiliary feed of un-joined secondary events and a set of flags, each flag in the set of flags indicating that a respective un-joined secondary event was properly joined; and replaying a subset of the un-joined secondary events in the auxiliary feed upon determining that the join audit check failed.

9. The apparatus of claim 8, the operations further comprising publishing the set of primary events after completing the first audit.

10. The apparatus of claim 8, the operations further comprising certifying the draft set of secondary events upon determining that the audit check passed.

11. The apparatus of claim 8, the performing a join audit check further comprising performing an inner join operation on the auxiliary feed and the set of flags.

12. The apparatus of claim 11, the performing an inner join operation comprising performing an inner join based on a shared join key.

13. The apparatus of claim 11, the replaying the subset of the un-joined secondary events comprising adding a result set of the inner join operation in a replay queue.

14. The apparatus of claim 8, the performing the join audit check further comprising identifying a dirty interval, a dirty interval comprising an interval in a join window that includes one or more raised flags in the set of flags for a corresponding un-joined secondary event.

15. A non-transitory computer-readable storage medium for tangibly storing computer program instructions capable of being executed by a computer processor, the computer program instructions defining the steps of:

completing a first audit for a primary event type, the first audit generating a set of primary events;

completing a second audit for a secondary event type, the second audit generating a draft set of secondary events and an auxiliary feed of un joined secondary events;

performing a join audit check on the auxiliary feed of un joined secondary events and a set of flags, each flag in the set of flags indicating that a respective un-joined secondary event was properly joined; and replaying a subset of the un-joined secondary events in the auxiliary feed upon determining that the join audit check failed.

16. The computer-readable storage medium of claim 15, the instructions further defining the step of publishing the set of primary events after completing the first audit.

17. The computer-readable storage medium of claim 15, the instructions further defining the step of certifying the draft set of secondary events upon determining that the audit check passed.

18. The computer-readable storage medium of claim 15, the performing a join audit check further comprising performing an inner join operation on the auxiliary feed and the set of flags.

19. The computer-readable storage medium of claim 18, the performing an inner join operation comprising performing an inner join based on a shared join key.

20. The computer-readable storage medium of claim 18, the replaying the subset of the un-joined secondary events comprising adding a result set of the inner join operation in a replay queue.

* * * * *